US012781293B2

(12) United States Patent
Ichikawa et al.

(10) Patent No.: US 12,781,293 B2
(45) Date of Patent: Nov. 3, 2026

(54) SUPPLY HEAT AMOUNT ESTIMATING METHOD, SUPPLY HEAT AMOUNT ESTIMATING DEVICE, AND BLAST FURNACE OPERATING METHOD

(71) Applicant: JFE STEEL CORPORATION, Tokyo (JP)

(72) Inventors: Kazuhira Ichikawa, Tokyo (JP); Tetsuya Yamamoto, Tokyo (JP); Takeshi Sato, Tokyo (JP); Yuki Kawashiri, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 407 days.

(21) Appl. No.: 18/268,744

(22) PCT Filed: Nov. 17, 2021

(86) PCT No.: PCT/JP2021/042183
§ 371 (c)(1),
(2) Date: Jun. 21, 2023

(87) PCT Pub. No.: WO2022/168396
PCT Pub. Date: Aug. 11, 2022

(65) Prior Publication Data

US 2024/0271231 A1 Aug. 15, 2024

(30) Foreign Application Priority Data

Feb. 5, 2021 (JP) ................................ 2021-017421

(51) Int. Cl.
*C21B 5/00* (2006.01)
*F27D 19/00* (2006.01)

(52) U.S. Cl.
CPC .............. *C21B 5/006* (2013.01); *F27D 19/00* (2013.01); *F27D 2019/0021* (2013.01)

(58) Field of Classification Search
None
See application file for complete search history.

(56) References Cited

U.S. PATENT DOCUMENTS 9,816,151 B2 * 11/2017 Ichikawa ................ C21B 5/008

FOREIGN PATENT DOCUMENTS

| | | | |
|---|---|---|---|
| CN | 105603135 | A | 5/2016 |
| CN | 109609714 | A | 4/2019 |
| EP | 3561082 | A1 | 10/2019 |
| JP | S49-020693 | B1 | 5/1974 |
| JP | H02-115311 | A | 4/1990 |
| JP | H07-305103 | A | 11/1995 |
| JP | H10-140218 | A | 5/1998 |

(Continued)

OTHER PUBLICATIONS

Mandal et al.—Steady-state thermal and material balance model for Blast furnace, Transactions of Indian Institute of Metals, 2013, vol. 67, p. 209-221. (Year: 2013).*

(Continued)

*Primary Examiner* — Devang R Patel
(74) *Attorney, Agent, or Firm* — Oliff PLC

(57) ABSTRACT

A supply heat amount estimating method for estimating an amount of heat supplied to pig iron in a blast furnace from an amount of heat supplied into the blast furnace and a rate of production of molten pig iron in the blast furnace, the supply heat amount estimating method includes: estimating a change in carried-out sensible heat by an in-furnace passing gas and a change in carried-in sensible heat supplied by a raw material preheated by the in-furnace passing gas and estimating the amount of heat supplied to the pig iron in the blast furnace in consideration of the estimated changes in the carried-out sensible heat and the carried-in sensible heat.

6 Claims, 4 Drawing Sheets

(56) References Cited

FOREIGN PATENT DOCUMENTS

| | | | | |
|---|---|---|---|---|
| JP | H10147804 | A | * | 6/1998 |
| JP | 2003328017 | A | * | 11/2003 |
| JP | 2005107940 | A | * | 4/2005 |
| JP | 2005320588 | A | * | 11/2005 |
| JP | 2008-144265 | A | | 6/2008 |
| JP | 2014118599 | A | * | 6/2014 |
| JP | 2018-145520 | A | | 9/2018 |
| JP | 6493447 | B2 | * | 4/2019 |
| JP | 6624212 | B2 | * | 12/2019 |
| JP | 2020029596 | A | * | 2/2020 |
| JP | 6729514 | B2 | * | 7/2020 |
| JP | 2022148377 | A | * | 10/2022 |
| KR | 10-1572388 | B1 | | 11/2015 |
| KR | 20180073176 | A | | 7/2018 |
| RU | 2 009 201 | C1 | | 3/1994 |
| RU | 2 190 667 | C1 | | 10/2002 |
| TW | I467955 | B | | 12/2001 |
| TW | I447229 | B | | 8/2014 |

OTHER PUBLICATIONS

Huang et al.—Numerical Investigation on Hot Metal Flow in Blast Furnace through CFD, ISIJ International, 2008, No. 9, p. 1182-1187. (Year: 2008).*

Mar. 1, 2024 Office Action issued in Russian Patent Application No. 2023120323.

Mar. 5, 2025 Office Action issued in European Patent Application No. 21924783.0.

Hatano et al., "A Mathematical Model of Blast Furance for Control of Hot Metal Temperature," Tetsu-to-Hagane, Mar. 1, 1981, vol. 67, No. 3, pp. 518-527.

Feb. 14, 2023 Office Action issued in Taiwanese Patent Application No. 110148084.

Jan. 25, 2022 International Search Report issued in International Patent Application No. PCT/JP2021/042183.

Matsuzaki et al., "Development of Mathematical Model of Blast Furnace," Nippon Steel Technical Report No. 94, Jul. 2006, pp. 87-95, XP093051546, Retrieved from the Internet: URL:https://www.nipponsteel.com/en/tech/report/nsc/pdf/n9415.pdf[retrieved on Jun. 2, 2023].

May 24, 2024 Extended Search Report issued European Patent Application No. 21924783.0.

Aug. 23, 2025 Office Action issued in Chinese Patent Application No. 202180092177.7 (with Concise Explanation of Relevance in English).

Jiang Yu; Cheng Wangsheng, "Understanding and Practice of the "Dead Material Column" in Maanshan Iron and Steel Blast Furnace Hearth", Modern Metallurgy, vol. 29, No. 3, pp. 24-27, Jun. 15, 2011.

* cited by examiner

SUPPLY HEAT AMOUNT ESTIMATING METHOD, SUPPLY HEAT AMOUNT ESTIMATING DEVICE, AND BLAST FURNACE OPERATING METHOD

FIELD

The present invention relates to a supply heat amount estimating method, a supply heat amount estimating device, and a blast furnace operating method for estimating the amount of heat supplied to pig iron in a blast furnace.

BACKGROUND

Generally, in order to stably operate a blast furnace, it is necessary to maintain the molten pig iron temperature within a predetermined range. Specifically, when the molten pig iron temperature becomes low, the viscosity of the molten pig iron and slag generated together with the molten pig iron increases, and it becomes difficult to discharge the molten pig iron or the slag from a tap hole. On the other hand, when the molten pig iron temperature becomes high, the Si concentration in the molten pig iron increases, and the viscosity of the molten pig iron increases, and thus there is a high risk that the molten pig iron contacts with a tuyere and melts the tuyere. Therefore, in order to stably operate a blast furnace, it is necessary to suppress the fluctuation of the molten pig iron temperature. From such a background, various methods for estimating the amount of heat supplied into a blast furnace or the molten pig iron temperature are proposed. Specifically, Patent Literature 1 discloses a furnace heat controlling method for a blast furnace, in which the molten pig iron temperature after a specific period of time is sequentially estimated from a displacement amount in a furnace heat index at the current time from a furnace heat index reference level corresponding to a target molten pig iron temperature, a displacement amount in a descending speed at the current time from a descending speed reference level of a furnace top corresponding to the target molten pig iron temperature, and time of influence of both of the displacement amounts to the molten pig iron temperature, and furnace heat control operation is performed so as to reduce fluctuations in the molten pig iron temperature on the basis of the estimation result. Moreover, Patent Literature 2 discloses a method of sampling gas in a longitudinal direction of a blast furnace, estimating the reaction rate of ores from a measurement result thereof, estimating the situation in the furnace through a model using a value of the reaction rate, and estimating the thermal state of a lower portion or others of the blast furnace and describes that the calculation accuracy of the heat balance in the lower portion of the blast furnace in the related art is improved by using a calculated value of the model. Furthermore, Patent Literature 3 discloses a means for improving the calculation accuracy of the reaction rate in a blast furnace by estimating the molten pig iron temperature discharged from the blast furnace through a model and changing a major reaction rate used in the model in consideration of the gas composition exhausted from an upper portion of the blast furnace. In addition, Patent Literatures 4 and 5 disclose a molten pig iron temperature estimating method for a blast furnace for estimating a future molten pig iron temperature on the basis of operation data including an actual value of blast condition data including at least one of a blast temperature, a blast humidity, a blast volume, a pulverized coal injection amount, or an oxygen enrichment amount in a blast furnace, an actual value of disturbance factor data including at least a solution loss carbon amount, and an actual value of the molten pig iron temperature, the method including: a data accumulation step of accumulating the operation data; a stationary state estimation model constructing step of constructing a stationary state estimation model for estimating a molten pig iron temperature in a stationary state from the operation data in the stationary state accumulated in the data accumulation step; non-stationary state estimation model constructing step of constructing a non-stationary state estimation model for estimating a molten pig iron temperature in a non-stationary state from the operation data in the non-stationary state accumulated in the data accumulation step, the non-stationary state estimation model obtained by reducing dimensions of the stationary state estimation model; and a molten pig iron temperature estimating step of estimating a molten pig iron temperature from the stationary state estimation model and the non-stationary state estimation model that have been constructed.

CITATION LIST

Patent Literature

Patent Literature 1: JP H2-115311 A
Patent Literature 2: JP S49-20693 B
Patent Literature 3: JP H10-147804 A
Patent Literature 4: JP 2008-144265 A
Patent Literature 5: JP 2018-145520 A

SUMMARY

Technical Problem

The timing at which the molten pig iron temperature is highly likely to greatly fluctuate is when the amount of molten pig iron produced changes due to a change in the rate of operation such as the blast volume in a blast furnace, and the amount of pig iron changes with respect to the amount of heat supplied into the blast furnace. However, since the method described in Patent Literature 1 does not take into consideration factors such as carried-out sensible heat by blast sensible heat, which is considered to change due to an increase or decrease in the rate of operation, it is not possible to accurately estimate the amount of heat supplied to pig iron when the rate of operation is greatly changed. On the other hand, in the methods described in Patent Literatures 2 and 3, in a case where the rate of operation is greatly changed at the timing when the gas sampling in the furnace is not performed, a change in the reaction rate cannot be reflected in the model, and there is a possibility that the estimation accuracy of the furnace heat is lowered. In addition, in the methods described in Patent Literatures 4 and 5, it is conceivable that the estimation accuracy of the molten pig iron temperature decreases when an operation change that has not been accumulated previously is performed. In addition, in a case where the estimation accuracy of the molten pig iron temperature is low as described above, there are many cases where the heat is excessively supplied, which brings about concerns about equipment trouble. Meanwhile, excessive use of a reducing material, which is a carbon source, is not preferable also from the perspective of reducing carbon dioxide emissions.

The present invention has been made in view of the above disadvantages, and an object of the present invention is to provide a supply heat amount estimating method and a supply heat amount estimating device capable of accurately estimating the amount of heat supplied to pig iron in a blast furnace even when the rate of operation greatly changes. Another object of the present invention is to provide a blast furnace operating method capable of accurately controlling the molten pig iron temperature within a predetermined range while maintaining the amount of heat supplied to the pig iron in the blast furnace to an appropriate amount even when the rate of operation greatly changes.

Solution to Problem

To solve the problem and achieve the object, a supply heat amount estimating method according to the present invention is the method for estimating an amount of heat supplied to pig iron in a blast furnace from an amount of heat supplied into the blast furnace and a rate of production of molten pig iron in the blast furnace. The method includes: an estimation step of estimating a change in carried-out sensible heat by an in-furnace passing gas and a change in carried-in sensible heat supplied by a raw material preheated by the in-furnace passing gas and estimating the amount of heat supplied to the pig iron in the blast furnace in consideration of the estimated changes in the carried-out sensible heat and the carried-in sensible heat.

Moreover, in the supply heat amount estimating method according to the present invention, the estimation step includes a step of estimating an amount of heat held in deadman coke present in the blast furnace and estimating the amount of heat supplied to the pig iron in the blast furnace in consideration of the estimated amount of heat held in the deadman coke.

Moreover, a supply heat amount estimating device according to the present invention is the device for estimating an amount of heat supplied to pig iron in a blast furnace from an amount of heat supplied into the blast furnace and a rate of production of molten pig iron in the blast furnace. The device includes: an estimation means for estimating a change in carried-out sensible heat by an in-furnace passing gas and a change in carried-in sensible heat supplied by a raw material preheated by the in-furnace passing gas and estimating the amount of heat supplied to the pig iron in the blast furnace in consideration of the estimated changes in the carried-out sensible heat and the carried-in sensible heat.

Moreover, in the supply heat amount estimating device according to the present invention, the estimation means estimates an amount of heat held in deadman coke present in the blast furnace and estimates the amount of heat supplied to the pig iron in the blast furnace in consideration of the estimated amount of heat held in the deadman coke.

Moreover, a blast furnace operating method according to the present invention includes a step of controlling an amount of heat supplied into a blast furnace on a basis of an amount of heat supplied to pig iron in the blast furnace estimated by the supply heat amount estimating method according to the present invention.

Advantageous Effects of Invention

According to a supply heat amount estimating method and a supply heat amount estimating device according to the present invention, it is possible to accurately estimate the amount of heat supplied to pig iron in a blast furnace even when the rate of operation greatly changes. In addition, according to a blast furnace operating method according to the present invention, it is possible to maintain the amount of heat supplied to the pig iron in the blast furnace to an appropriate amount and to accurately control the molten pig iron temperature within a predetermined range even when the rate of operation greatly changes.

DESCRIPTION OF EMBODIMENTS

Hereinafter, a configuration and operation of a furnace heat controlling device as an embodiment of the present invention to which a supply heat amount estimating method and a supply heat amount estimating device according to the present invention are applied will be described with reference to the drawings.

[Configuration]

Figure 1:
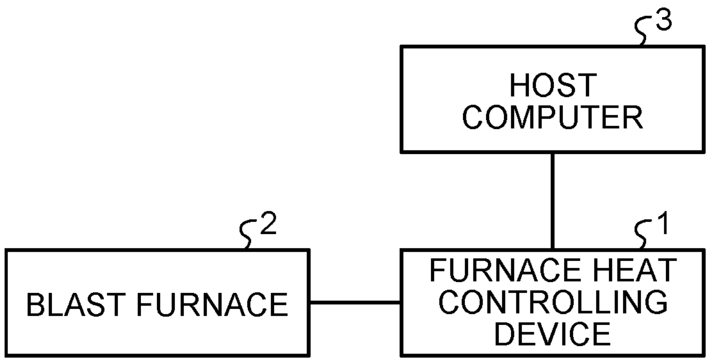
FIG. 1 is a block diagram illustrating a configuration of a furnace heat controlling device according to an embodiment of the present invention.

First, with reference to FIG. 1, the configuration of the furnace heat controlling device as an embodiment of the present invention will be described. FIG. 1 is a block diagram illustrating the configuration of the furnace heat controlling device as an embodiment of the present invention. As illustrated in FIG. 1, a furnace heat controlling device 1 according to an embodiment of the present invention includes an information processing device, such as a computer, and controls the temperature of molten pig iron produced in a blast furnace 2 within a predetermined range by controlling the amount of heat supplied to melt iron in the blast furnace 2 from a tuyere provided in a lower portion of the blast furnace 2.

The furnace heat controlling device 1 having such a configuration accurately estimates the amount of heat supplied to pig iron in the blast furnace 2 even when the rate of operation of the blast furnace 2 greatly changes by execution of furnace heat controlling processing described below, maintains the amount of heat supplied to the pig iron in the blast furnace 2 at an appropriate amount using the estimation result, and accurately controls the molten pig iron temperature within a predetermined range. Hereinafter, a flow of furnace heat controlling processing as an embodiment of the present invention will be described with reference to FIG. 2.

[Furnace Heat Controlling Processing]

Figure 2:
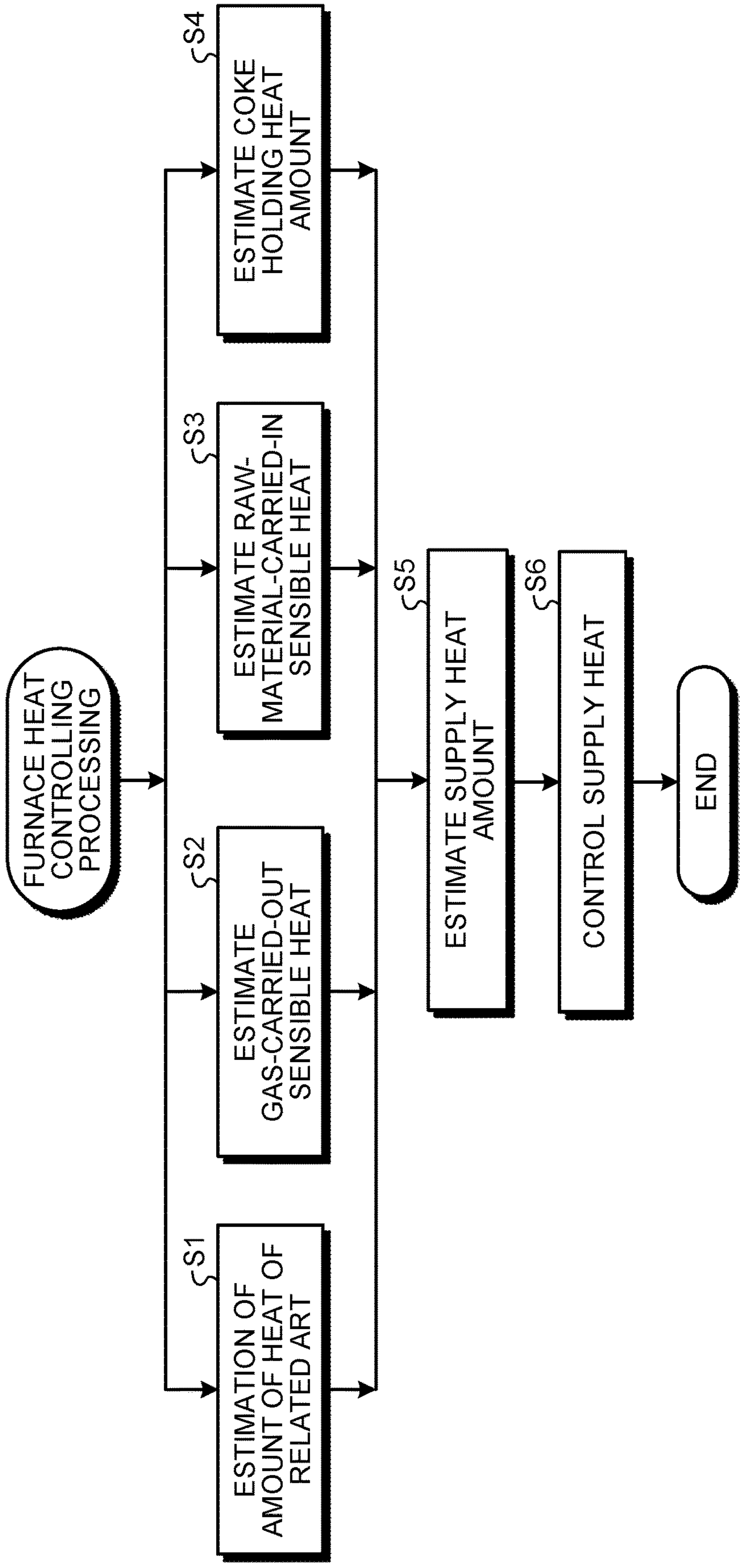
FIG. 2 is a flowchart illustrating a flow of furnace heat controlling processing as an embodiment of the present invention.

FIG. 2 is a flowchart illustrating a flow of the furnace heat controlling processing as the embodiment of the present invention. The flowchart illustrated in FIG. 2 starts at the timing when an execution command of the furnace heat controlling processing is input to the furnace heat controlling device 1, and in the furnace heat controlling processing, in addition to processing of step S1 of estimating the amount of heat supplied into the blast furnace with reaction heat balance (exothermic reaction heat and endothermic reaction heat), blast sensible heat, a heat loss (e.g. amount of heat removed from the furnace body), and others in the blast furnace that is performed in the related art, processing of step S2, step S3, and preferably step S4 is further performed, and the flow proceeds to processing of step S5 of estimating the supply heat amount by integrating these steps. The processing of step S1 of estimating the amount of heat supplied into the blast furnace with reaction heat balance (exothermic reaction heat and endothermic reaction heat), blast sensible heat, a heat loss (e.g. amount of heat removed from the furnace body), and others in the blast furnace is performed in the related art, and the supply heat amount at this point is denoted as $Q_0$. A preferred example of the processing in step S1 will be described later.

In the processing of step S2, the furnace heat controlling device 1 estimates sensible heat (gas-carried-out sensible heat) $Q_7$ carried out to an upper portion of the blast furnace 2 by gas (in-furnace passing gas) passing from a lower portion to the upper portion of the blast furnace 2. Specifically, the gas-carried-out sensible heat $Q_7$ (MJ/t-p: amount of heat per one ton of pig iron. Hereinafter, t-p represents pig iron tonnage) can be calculated by multiplying a temperature difference between an estimated temperature of gas combusted in front of a tuyere and a reference temperature representing the temperature at an upper end of the lower portion of the blast furnace by the specific heat of the gas, which is expressed by the following Equation (1). As a result, the processing of step S2 is completed, and the flow proceeds to the processing of step S5.

$$Q_7 = \alpha \cdot \left\{\sum (C_i \cdot V_i)\right\} \cdot (TFT - T_{base}) \cdot \frac{1}{Pig} \quad (1)$$

Here, $C_i$ denotes the specific heat (MJ/m$^3$/° C.) of a gas species i (nitrogen, carbon monoxide, and hydrogen), $V_i$ denotes the flow rate (m$^3$ (s.t.p)/min) of the gas species i in Bosch gas (m$^3$ (s.t.p): volume at 0° C. and 1 atm (atmospheric pressure)), TFT denotes the theoretical combustion temperature (° C.), $T_{base}$ denotes the reference temperature (° C.) (800 to 1200° C., preferably 900 to 1000° C.), Pig denotes the iron making speed (t-p/min), and a denotes an influence coefficient to be modified depending on the blast furnace 2. These values can be acquired from a host computer 3 such as a process computer connected to the furnace heat controlling device 1 via a telecommunication line, for example.

In the processing of step S3, the furnace heat controlling device 1 estimates sensible heat (raw-material-carried-in sensible heat) $Q_8$ carried in to the lower portion of the blast furnace 2 by a raw material supplied from the upper portion to the lower portion of the blast furnace 2. Specifically, the material-carried-in sensible heat $Q_8$ (MJ/t-p) can be calculated by multiplying a temperature difference between the raw material temperature $T_1$ (=1450 to 1500° C.) at a lower end of a cohesive zone and the reference temperature $T_{base}$ by the specific heat of the raw material as expressed by the following Equation (2). As a result, the processing of step S3 is completed, and the flow proceeds to the processing of step S5.

$$Q_8 = \beta \cdot \left\{\sum (C_j \cdot R_j)\right\} \cdot (T_1 - T_{base}) \quad (2)$$

Here, $C_j$ denotes the specific heat (MJ/kg/° C.) of a raw material j (coke, pig iron, and slag), $R_j$ denotes an intensity (kg/t-p) of the raw material j, $T_1$ denotes the raw material temperature (° C.) at the lower end of the cohesive zone, $T_{base}$ denotes the reference temperature (° C.), and β denotes an influence coefficient to be modified depending on the blast furnace 2. These values can be acquired from, for example, the host computer 3.

In the processing of step S4, the furnace heat controlling device 1 estimates the amount of heat (coke holding heat amount) $Q_9$ held in the deadman coke present in the lower portion of the blast furnace 2. Specifically, the coke holding heat amount $Q_9$ (MJ/t-p) can be obtained by multiplying a value obtained by subtracting a combustion consumption amount and a carbon amount discharged as dust from the coke intensity per 1 t of molten pig iron by a difference between a reference temperature and a theoretical combustion temperature and the specific heat $C_{coke}$ of coke and is expressed by the following Equation (3). As a result, the processing of step S4 is completed, and the flow proceeds to the processing of step S5. Note that the processing in step S4 may be omitted.

$$Q_9 = \gamma \cdot C_{Coke} \cdot (\delta \cdot TFT - T_{base}) \cdot \left\{CR - \frac{(CR_{burn} - PCR \cdot C_{inPC}) + C_{sol} + \text{Dust} \cdot C_{indust}}{0.88}\right\} \quad (3)$$

Incidentally, $C_{coke}$ denotes the specific heat of coke (MJ/kg/° C.), TFT denotes the theoretical combustion temperature (° C.), $T_{base}$ denotes the reference temperature (° C.), CR denotes a coke ratio (kg/t-p), $CR_{burn}$ denotes a combustion carbon ratio in front of the tuyere (amount of oxygen consumed in front of the tuyere by blown oxygen and humidification) (kg/t-p), PCR denotes a pulverized coal ratio (kg/t-p), $C_{inPc}$ denotes a carbon ratio in pulverized coal, $C_{sol}$ denotes a solution loss carbon ratio (kg/t-p), Dust denotes a dust ratio (kg/t-p), $C_{indust}$ denotes a carbon ratio in dust, and γ and δ denote influence coefficients to be modified depending on the blast furnace 2. These values can be acquired from, for example, the host computer 3.

In the processing of step S5, the furnace heat controlling device 1 estimates the amount of heat supplied to the pig iron in the blast furnace 2 using the supply heat amount $Q_0$ estimated in the processing of step S1, the gas-carried-out sensible heat $Q_7$ estimated in the processing of steps S2 to S4, the material-carried-in sensible heat $Q_8$, and the coke holding heat amount $Q_9$. Specifically, the furnace heat controlling device 1 calculates a furnace heat index $T_Q$ (MJ/t-p) corresponding to the amount of heat supplied to the pig iron in the blast furnace 2 by substituting the supply heat amount $Q_0$ estimated in step S1, the gas-carried-out sensible heat $Q_7$ estimated in the processing of steps S2 to S4, the material-carried-in sensible heat $Q_8$, and the coke holding heat amount $Q_9$ into the following Equation (4). As a result, the processing of step S5 is completed, and the flow proceeds to the processing of step S6. Note that, in a case where the processing of step S4 is omitted, the value of the coke holding heat amount $Q_9$ is set to 0.

$$T_Q = Q_0 - Q_7 + Q_8 - Q_9 \quad (4)$$

Incidentally, $Q_0$ denotes the amount of heat supplied into the blast furnace by the reaction heat balance (exothermic reaction heat and endothermic reaction heat), the blast sensible heat, the heat loss (e.g. the amount of heat removed from the furnace body), and others in the blast furnace, and an estimation method adopted in many cases in the supply heat amount estimation of the related art can be applied. As a preferable approach, Equation (5) is conceivable.

$$Q_0 = Q_1 + Q_2 - Q_3 - Q_4 - Q_5 - Q_6 \tag{5}$$

Incidentally, $Q_1$ denotes the combustion heat (MJ/t-p) of coke at the tip of the tuyere. The combustion heat $Q_1$ can be calculated by dividing a calorific value due to combustion of coke calculated from the amount of oxygen blown from the tuyere to the blast furnace per unit time by the amount of molten pig iron produced in the unit time.

Meanwhile, $Q_2$ denotes blast sensible heat (MJ/t-p) supplied to the blast furnace by the blast from the tuyere. The blast sensible heat $Q_2$ can be calculated by obtaining the amount of heat input to the blast furnace by blast per unit time from the blast volume per unit time and a measured value of the blast temperature and dividing this value by the amount of molten pig iron produced in the unit time.

$Q_3$ denotes solution loss reaction heat (MJ/t-p). For this value, for example, as described in Patent Literature 1, the reaction heat can be calculated by obtaining the solution loss carbon amount from component values of gas at the furnace top. The solution loss reaction heat $Q_3$ can be calculated by dividing the solution loss reaction heat by the amount of molten pig iron produced in the unit time.

$Q_4$ denotes heat of decomposition (MJ/t-p) of moisture contained mainly in the blast. The heat of decomposition $Q_4$ can be calculated by dividing the heat of decomposition obtained from a measurement value of the blown moisture by the amount of molten pig iron produced in the unit time.

In addition, $Q_8$ denotes a heat loss (for example, the amount of heat removed by cooling water) from the furnace body (MJ/t-p). In a case where the amount of heat removed by cooling water is calculated as the heat loss, the amount of heat removed $Q_8$ can be calculated by calculating the amount of heat removed by the cooling water per unit time from the amount of the cooling water and a temperature difference between an inlet side and an outlet side of the cooling water of the blast furnace body and dividing the calculated amount of heat removed by the amount of molten pig iron produced in the unit time.

$Q_6$ denotes the heat of decomposition (MJ/t-p) of a reducing material blown from the tuyere per unit time. The heat of decomposition $Q_6$ can be calculated by dividing the heat of decomposition by the amount of molten pig iron produced in the unit time.

In the processing of step S6, the furnace heat controlling device 1 controls the amount of heat supplied from the tuyere into the blast furnace 2 on the basis of the amount of heat supplied to the pig iron in the blast furnace 2 estimated in the processing of step S5, thereby maintaining the amount of heat supplied to the pig iron in the blast furnace 2 at an appropriate amount and controlling the molten pig iron temperature within a predetermined range. As a result, the processing of step S6 is completed, and a series of furnace heat controlling processing ends.

As is apparent from the above description, in the furnace heat controlling processing according to the embodiment of the present invention, the furnace heat controlling device 1 estimates a change in carried-out sensible heat to the upper portion of the blast furnace by the in-furnace passing gas and a change in carried-in sensible heat supplied to the lower portion of the blast furnace by the raw material preheated by the in-furnace passing gas and estimates the amount of heat supplied to the pig iron in the blast furnace in consideration of the estimated changes in the carried-out sensible heat and carried-in sensible heat, and thus it is possible to accurately estimate the amount of heat supplied to the pig iron in the blast furnace even when the rate of operation such as the blast volume to the blast furnace greatly changes. In addition, this makes it possible to maintain the amount of heat supplied to the pig iron in the blast furnace to an appropriate amount and to accurately control the molten pig iron temperature within a predetermined range even when the rate of operation greatly changes.

EXAMPLE

Figure 3:
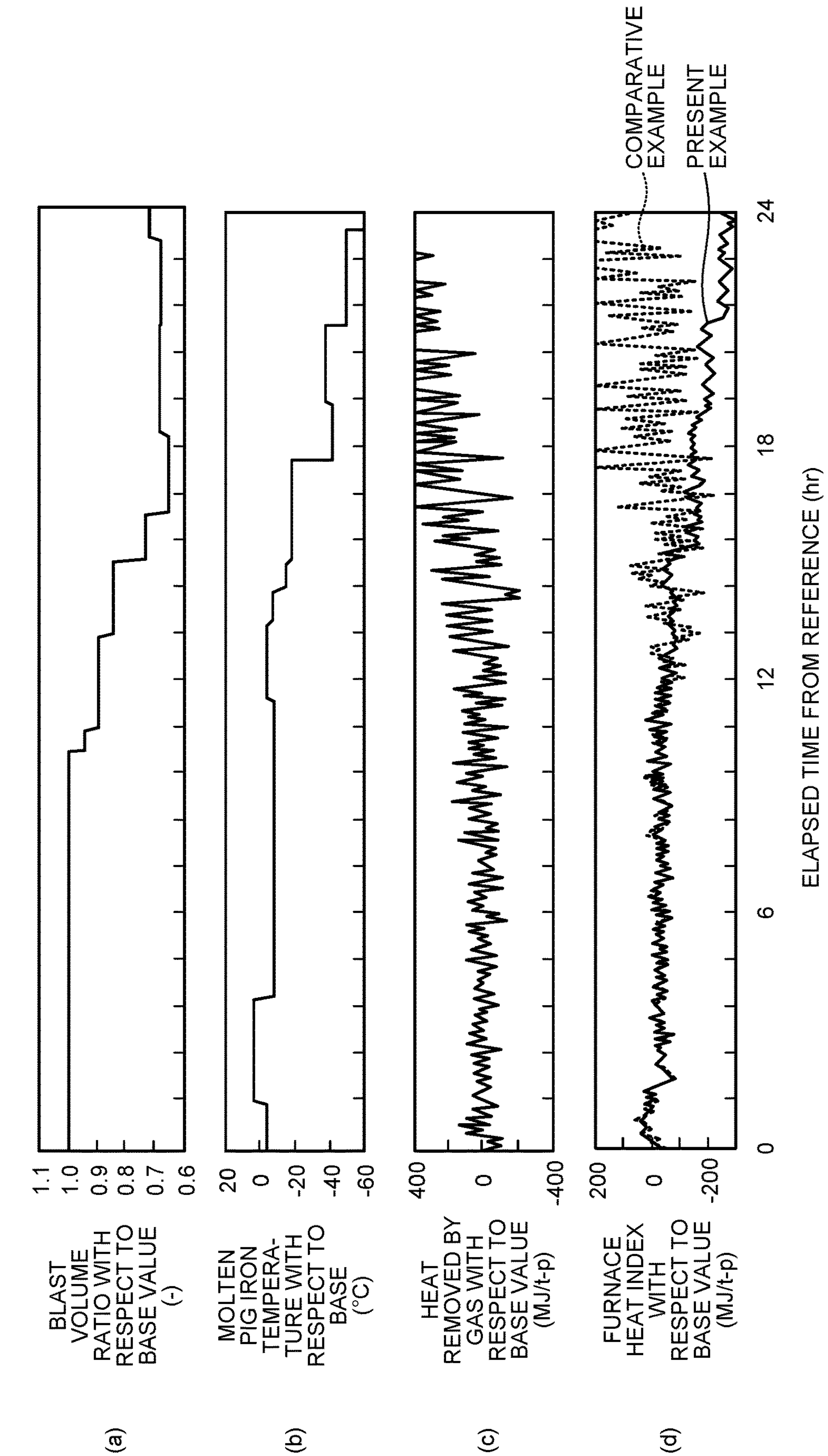
FIG. 3 is a diagram illustrating an example of changes in indices of the related art and a furnace heat index of the present invention accompanied by changes in the blast volume.
Figure 4:
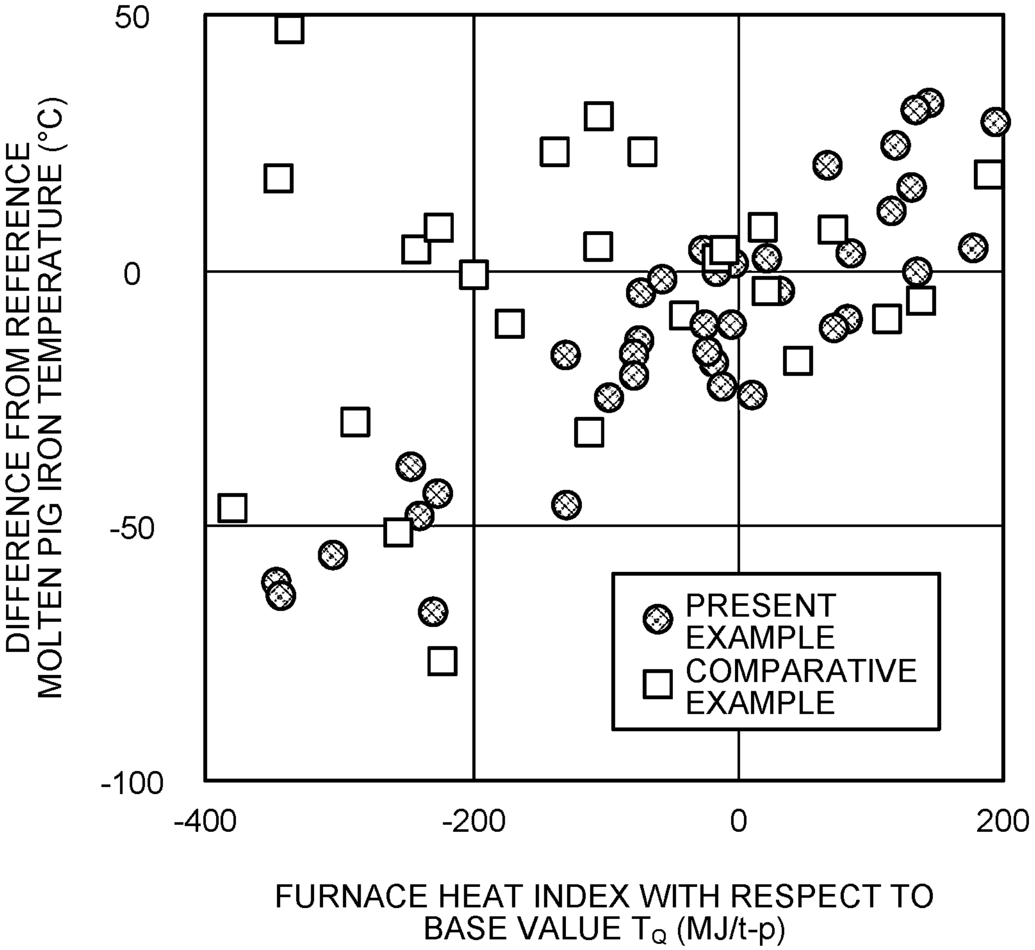
FIG. 4 is a diagram illustrating an example of relationships between an index of the related art and a temperature difference from a reference molten pig iron temperature and between the furnace heat index of the present invention and the temperature difference from the reference molten pig iron temperature.

Effects obtained in a case where the invention of the present application is applied will be specifically described with reference to FIG. 3. In FIG. 3, the horizontal axis represents time, and as an operation condition, the changes with time of the furnace heat index estimated by a method of the related art and the furnace heat index estimated by applying the aspect of the invention of the present application in a state where the blast volume greatly changes are illustrated. Illustrated in FIG. 3(*a*) is the change with time of the actual value of the blast volume presented by a blast volume ratio where a base value of the blast volume is set to 1.0 as the operation condition. Illustrated in FIG. 3(*b*) is the change with time of the actual value of the molten pig iron temperature as a relative value where a base value is 0° C. Illustrated in FIG. 3(*c*) is the change with time of the estimated value ($Q_7$) of heat removed by gas as a relative value where a base value of the heat removed by gas is 0 (MJ/t-p). Illustrated in FIG. 3(*d*) is the change with time of the estimated amount of heat supplied into the blast furnace (furnace heat index) as a relative value where a base value of the furnace heat index is 0 (MJ/t-p). In the example of the related art (comparative example), the estimation is performed using the values of $Q_1$ to $Q_6$ described above, and in the present example, a result obtained from estimation using the values of $Q_i$ to $Q_9$ is shown. In a case where the amount of heat supplied into the blast furnace is managed using only the values of $Q_i$ to $Q_6$ described above, the amount of heat supplied into the blast furnace cannot be accurately estimated when the rate of operation is greatly changed since the carried-out sensible heat due to the blast sensible heat and the like, which are considered to change by the change in the rate of operation, are not considered. Specifically, as illustrated in FIGS. 3(*a*) to 3(*c*), in a case where the molten pig iron temperature decreases due to a decrease in the blast volume and the carried-out sensible heat (heat removed by gas) by the in-furnace passing gas increases, the furnace heat index of the related art (comparative example) based on the values of $Q_i$ to $Q_6$ increases and greatly fluctuates as illustrated in FIG. 3(*d*). For this reason, in a case where the blast furnace is operated on the basis of the furnace heat index of the related art, there is a possibility that it is not possible to make a determination to increase a decreasing molten pig iron temperature and that a discharge failure of the molten pig iron occurs due to the decrease in the molten pig iron temperature. On the other hand, the furnace heat index of the present invention (the present example) takes into consideration the amount of heat increased or decreased by the blast, and thus the furnace heat index decreases as the molten pig iron temperature decreases, and the fluctuation is also small. Therefore, in a case where the blast furnace is operated on the basis of the furnace heat index of the present invention, the molten pig iron temperature can be accurately controlled to be within the predetermined range. More data were further collected, and results of comparing the furnace heat index of the related art (estimated by $Q_i$ to $Q_6$) and the furnace heat index of the present invention (estimated by $Q_i$ to $Q_9$) at more timing points when the blast volume greatly decreases with the actual molten pig iron temperature (difference from the reference molten pig iron temperature) are Illustrated in FIG. 4. As illustrated in FIG. 4, in the furnace heat index of the present invention, a certain correlation between the furnace heat index and the molten pig iron temperature (difference from the reference molten pig iron temperature) can be confirmed as compared with the furnace heat index of the related art. In addition, shown in Table 1 is a summary of standard deviations of a difference between the estimated molten pig iron temperature and the actual molten pig iron temperature in a case where factors of each example are taken into consideration. It can be seen that the estimation accuracy is improved by adding $Q_7$ and $Q_8$ to the estimation (Example 1), and the estimation accuracy is improved by further adding $Q_9$ to the estimation (Example 2) as compared with the case where the furnace heat index is estimated using only $Q_i$ to $Q_6$ as the furnace heat index of the related art. As a result, it can be seen that, by using the furnace heat index of the present invention, it is made possible to maintain the amount of heat supplied to the pig iron in the blast furnace to an appropriate amount and to accurately control the molten pig iron temperature within a predetermined range.

TABLE 1

| | Comparative example | Example 1 | Example 2 |
|---|---|---|---|
| Indices considered | Q1 to Q6 | Q1 to Q8 | Q1 to Q9 |
| Standard deviations of actual molten pig iron temperature with respect to estimated molten pig iron temperature | 39.4 | 15.9 | 14.5 |

Although the embodiments to which the invention made by the present inventors is applied have been described above, the present invention is not limited by the description and the drawings included as a part of the disclosure of the present invention according to the present embodiments. That is, other embodiments, examples, operation techniques, and the like made by those skilled in the art on the basis of the present embodiment are all included in the scope of the present invention.

INDUSTRIAL APPLICABILITY

According to the present invention, it is possible to provide a supply heat amount estimating method and a supply heat amount estimating device capable of accurately estimating the amount of heat supplied to pig iron in a blast furnace even when the rate of operation greatly changes. According to the present invention, it is also possible to provide a blast furnace operating method capable of maintaining the amount of heat supplied to the pig iron in the blast furnace to an appropriate amount and to accurately control the molten pig iron temperature within a predetermined range even when the rate of operation greatly changes.

REFERENCE SIGNS LIST

1 FURNACE HEAT CONTROLLING DEVICE
2 BLAST FURNACE
3 HOST COMPUTER

The invention claimed is:

1. A supply heat amount estimating method for estimating an amount of heat supplied to pig iron in a blast furnace from an amount of heat supplied into the blast furnace and a rate of production of molten pig iron in the blast furnace, the supply heat amount estimating method comprising:

estimating a change in carried-out sensible heat by an in-furnace passing gas and a change in carried-in sensible heat supplied by a raw material preheated by the in-furnace passing gas; and estimating the amount of heat supplied to the pig iron in the blast furnace using the estimated changes in the carried-out sensible heat and the carried-in sensible heat, wherein the estimating the change in the carried-out sensible heat includes calculating the carried-out sensible heat by multiplying a temperature difference between an estimated temperature of gas combusted in front of a tuyere of the blast furnace and a reference temperature representing the temperature at an upper end of the lower portion of the blast furnace by the specific heat of the in-furnace passing gas, the specific heat of the in-furnace passing gas is determined by multiplying, for each gas species of the in-furnace passing gas, a specific heat of the gas species by a flow rate of the gas species in Bosch gas, and the reference temperature is in a range of 800° C. to 1200° C.

2. The supply heat amount estimating method according to claim 1, wherein the estimating the amount of heat supplied to the pig iron in the blast furnace includes:

estimating an amount of heat held in deadman coke present in the blast furnace and estimating the amount of heat supplied to the pig iron in the blast furnace using the estimated amount of heat held in the deadman coke.

3. A supply heat amount estimating device for estimating an amount of heat supplied to pig iron in a blast furnace from an amount of heat supplied into the blast furnace and a rate of production of molten pig iron in the blast furnace, the supply heat amount estimating device comprising a processor comprising hardware, the processor being configured to:

estimate a change in carried-out sensible heat by an in-furnace passing gas and a change in carried-in sensible heat supplied by a raw material preheated by the in-furnace passing gas; and estimate the amount of heat supplied to the pig iron in the blast furnace using the estimated changes in the carried-out sensible heat and the carried-in sensible heat, wherein the processor is configured to calculate the carried-out sensible heat by multiplying a temperature difference between an estimated temperature of gas combusted in front of a tuyere of the blast furnace and a reference temperature representing the temperature at an upper end of the lower portion of the blast furnace by the specific heat of the in-furnace passing gas, the specific heat of the in-furnace passing gas is determined by multiplying, for each gas species of the in-furnace passing gas, a specific heat of the gas species by a flow rate of the gas species in Bosch gas, and the reference temperature is in a range of 800° C. to 1200° C.

4. The supply heat amount estimating device according to claim 3, wherein the processor is configured to:

estimate an amount of heat held in deadman coke present in the blast furnace; and estimate the amount of heat supplied to the pig iron in the blast furnace using the estimated amount of heat held in the deadman coke.

5. A blast furnace operating method comprising controlling an amount of heat supplied into a blast furnace on a basis of an amount of heat supplied to pig iron in the blast furnace estimated by the supply heat amount estimating method according to claim 1.

6. A blast furnace operating method comprising controlling an amount of heat supplied into a blast furnace on a basis of an amount of heat supplied to pig iron in the blast furnace estimated by the supply heat amount estimating method according to claim 2.

* * * * *